United States Patent
Libin (10) Patent No.: US 12,114,095 B1
(45) Date of Patent: Oct. 8, 2024

(54) PARAMETRIC CONSTRUCTION OF HYBRID ENVIRONMENTS FOR VIDEO PRESENTATION AND CONFERENCING

(71) Applicant: mmhmm inc., Little Rock, AR (US)

(72) Inventor: Phil Libin, Bentonville, AR (US)

(73) Assignee: mmhmm inc., Little Rock, AR (US)

( * ) Notice: Subject to any disclaimer, the term of this patent is extended or adjusted under 35 U.S.C. 154(b) by 270 days.

(21) Appl. No.: 17/941,305

(22) Filed: Sep. 9, 2022

Related U.S. Application Data (60) Provisional application No. 63/243,650, filed on Sep. 13, 2021.

(51) Int. Cl.
| | |
|---|---|
| G06F 3/0481 | (2022.01) |
| G06F 3/01 | (2006.01) |
| G06F 3/04847 | (2022.01) |
| G06F 3/0486 | (2013.01) |
| H04N 5/272 | (2006.01) |
| H04N 7/15 | (2006.01) |
| H04N 7/14 | (2006.01) |

(52) U.S. Cl.
CPC .......... H04N 5/272 (2013.01); G06F 3/011 (2013.01); G06F 3/0481 (2013.01); G06F 3/04847 (2013.01); G06F 3/0486 (2013.01); H04N 7/15 (2013.01); H04N 7/147 (2013.01)

(58) Field of Classification Search
CPC .... G06F 3/011; G06F 3/0481; G06F 3/04847; G06F 3/0486; H04N 7/15; H04N 5/272
USPC ....... 715/730, 731, 732, 733, 753, 756, 757, 715/758, 759
See application file for complete search history.

(56) References Cited

U.S. PATENT DOCUMENTS

| | | | | |
|---|---|---|---|---|
| 2005/0251731 | A1* | 11/2005 | Valderas | G11B 27/32 715/255 |
| 2013/0314421 | A1* | 11/2013 | Kim | G06T 19/00 345/427 |
| 2014/0058894 | A1* | 2/2014 | Hohenacker | G06Q 30/0613 705/26.41 |
| 2016/0073029 | A1* | 3/2016 | Markovitz | H04N 5/2621 348/333.01 |
| 2017/0039867 | A1* | 2/2017 | Fieldman | G09B 7/00 |
| 2020/0186727 | A1* | 6/2020 | Denoue | G06V 40/20 |

* cited by examiner

*Primary Examiner* — Ting Z Lee
(74) *Attorney, Agent, or Firm* — Muirhead and Saturnelli, LLC (57) ABSTRACT

Providing a video presentation includes preparing a plurality of different background environments that include a structured list of visual components and parameters therefor for different portions of the presentation prior to the video presentation, selecting a subset of the background environments, value ranges, and initial values for a subset of the parameters of the background environments prior to the presentation, selecting multiple alternative background environments for at least one of the portions prior to the video presentation, presenting to an audience at least one presenter superimposed on the different ones of the background environments during different portions of the video presentation, replacing a particular one of the background environments for the at least one of the portions during the presentation with one of the multiple alternative background environments, and modifying values selected for at least some of the subset of the parameters during the video presentation within the value ranges.

16 Claims, 8 Drawing Sheets

PARAMETRIC CONSTRUCTION OF HYBRID ENVIRONMENTS FOR VIDEO PRESENTATION AND CONFERENCING

CROSS-REFERENCE TO RELATED APPLICATIONS

This application claims priority to U.S. Prov. App. No. 63/243,650, filed on Sep. 13, 2021, and entitled "PARAMETRIC CONSTRUCTION OF HYBRID ENVIRONMENTS FOR VIDEO PRESENTATION AND CONFERENCING", which is incorporated herein by reference.

TECHNICAL FIELD

This application is directed to the fields of video recording, visual communications, and user interfaces, and more particularly to the field of parametric construction and use of hybrid environments for video presentation and video conferencing.

BACKGROUND OF THE INVENTION

Hybrid lifestyle is transforming the contemporary workplace, lifestyles, communications, entertainment, and many more areas of our lives. Hybrid companies, hybrid teams, hybrid presentations and communications, hybrid approach to education and training introduce a new and quickly evolving understanding of the future where the physical and the virtual reality, the synchronous and the asynchronous processes are permanently and irreversibly intertwined and are coexisting in a variety of shapes.

Two areas where the hybrid approach creates important and lasting effects are video presentations and video conferencing. Online and local video content is quickly becoming the dominant productivity medium for instructional materials and training, education, marketing, product support and development, e-commerce, business communications and presentations, etc. According to market research, the size of a worldwide market of video marketing alone has reached $33 billion in 2020 and is expected to increase to almost $46 billion by 2025. Usage statistics confirm this trend: an estimated 78% of Internet users watch videos online every week, while 55% watch online videos daily; over 95% of Internet users are watching at least one explainer video for every product or service they are interested in to learn more about their features and functioning. Additionally, video presentations have raised to the third most popular type of the video content after explainer and social media videos. Video conferencing, in its turn, is quickly growing with the rise of a remote, geographically dispersed workforce, the proliferation of the hybrid lifestyle and in response to multiple challenges caused by the COVID-19 pandemic. Video conferencing is quickly becoming a key communications medium, connecting people through their work, personal, and family lives. According to market studies, 78% of corporate businesses are currently using video conferencing to facilitate team collaboration and 58% of companies incorporate video conferencing into their daily operations. On an average day, US businesses conduct over 11 million video meetings, among which Zoom alone has over 300 million daily participants.

With the emergence of distributed companies and out-of-office work style, authors of video presentations and organizers of video conferences, watch parties and other asynchronous and synchronous activities are often recording their presentations and conducting video conferences from their homes and neighborhoods. The authors are increasingly using augmented reality components of their video materials and are supplementing or replacing realistic interior and exterior views and other types of physical environments with virtual backgrounds and objects, which may benefit aesthetical, entertaining, educational and productivity aspects of the video content. This is especially true for the immersive experiences, pioneered by the mmhmm software and other video presentation and conferencing solutions where authors are represented by their real-time segmented images, extracted from the front-camera video streams. In these hybrid environments, presentation material, such as slides, may be projected upon a physical, virtual, or combined backdrop or other type of scene, while presenters or video conference organizers are immersed into the scene.

Accordingly, virtual presentation and conferencing environments, such as static and animated virtual backgrounds, are quickly growing in popularity. Nearly every leading video conferencing service, including Zoom, Google Meet, and WebEx, are offering extended sets of virtual backgrounds. In addition applications like ManyCam, SnapCamera, and ChromaCam offer advanced background sets.

SUMMARY OF THE INVENTION

Notwithstanding the recent developments, creation, and distribution of virtual environments for video presentations and video conferencing is in its early stage. Systematic, structured approaches to synthesizing virtual and hybrid environments for either usage case have not been built. There are no proven mechanisms for altering virtual environments to follow the flow of video presentations and conferences and update the environments as necessary based on the audience feedback. Intuitive user interfaces for modifying virtual and hybrid environments on the fly have not been developed.

Accordingly, it is useful to provide techniques and systems for synthesizing hybrid environments for video presentations and conferences.

According to the system described herein, providing a video presentation includes preparing a plurality of different background environments for different portions of the video presentation prior to the video presentation, the background environments including a structured list of visual components and parameters therefor, selecting a subset of the background environments, value ranges, and initial values for a subset of the parameters of the background environments prior to the video presentation, selecting multiple alternative background environments for at least one of the portions prior to the video presentation, presenting to an audience at least one presenter superimposed on the different ones of the background environments during different portions of the video presentation, replacing a particular one of the background environments for the at least one of the portions during the presentation with one of the multiple alternative background environments, and modifying values selected for at least some of the subset of the parameters during the video presentation within the value ranges. At least one of the background environments may be a physical background environment. A visual component may be superimposed on at least one portion of at least one of the physical background environments. A plurality of virtual layers may be superimposed with at least one of the physical background environments. At least some of the layers may be semi-transparent or fully transparent to provide visibility to at least one of subsequent ones of the layers. At least one of the physical background environments may be a room interior, a park, a city skyline, a theater, a stadium, a factory, a mountain, a forest, and/or an ocean. The parameters may include geometry, lighting, and behavior. Geometry may include dimension of the components, shape of the components, subdivision of the components, and/or connections of the components to other components and/or to background environments. The lighting may emulate weather, time of the day, and/or season. The behavior may include animations, videos played on panes of one of the background environments, and/or dynamic effects. Different parts of the particular background environment may be characterized by material, color, texture, and ornament. Values for at least some of the subset of parameters may be modified automatically based on reaction of the audience to the video presentation. The at least one presenter may modify values selected for at least some of the subset of parameters based on reaction of the audience to the video presentation. The at least one presenter may modify values by invoking a runtime editing interface that automatically actuates drop down panes attached to a subset of the background environments to present value ranges of parameters. A runtime editing interface to modify the values may be automatically invoked and may actuate drop down panes attached to a subset of the background environments to present value ranges of parameters.

According further to the system described herein, a non-transitory computer readable medium contains software that provides a video presentation using a plurality of different background environments having a structured list of visual components and parameters for different portions of the video presentation that are prepared prior to the video presentation. Prior to the video presentation, a subset of the background environments, value ranges, and initial values for a subset of the parameters of the background environments are selected. Prior to the video presentation, multiple alternative background environments are selected for at least one of the portions of the video presentation. The software includes executable code that presents to an audience at least one presenter superimposed on the different ones of the background environments during different portions of the video presentation, executable code that replaces a particular one of the background environments for the at least one of the portions during the presentation with one of the multiple alternative background environments, and executable code that modifies values selected for at least some of the subset of the parameters during the video presentation within the value ranges. At least one of the background environments may be a physical background environment. A visual component may be superimposed on at least one portion of at least one of the physical background environments. A plurality of virtual layers may be superimposed with at least one of the physical background environments. At least some of the layers may be semi-transparent or fully transparent to provide visibility to at least one of subsequent ones of the layers. At least one of the physical background environments may be a room interior, a park, a city skyline, a theater, a stadium, a factory, a mountain, a forest, and/or an ocean. The parameters may include geometry, lighting, and behavior. Geometry may include dimension of the components, shape of the components, subdivision of the components, and/or connections of the components to other components and/or to background environments. The lighting may emulate weather, time of the day, and/or season. The behavior may include animations, videos played on panes of one of the background environments, and/or dynamic effects. Different parts of the particular background environment may be characterized by material, color, texture, and ornament. Values for at least some of the subset of parameters may be modified automatically based on reaction of the audience to the video presentation. The at least one presenter may modify values selected for at least some of the subset of parameters based on reaction of the audience to the video presentation. The at least one presenter may modify values by invoking a runtime editing interface that automatically actuates drop down panes attached to a subset of the background environments to present value ranges of parameters. A runtime editing interface to modify the values may be automatically invoked and may actuate drop down panes attached to a subset of the background environments to present value ranges of parameters.

The proposed system offers an environment graph builder and an editing user interface for the parametric construction of video presentation and conferencing environments, adapted to a categorized set of components and parameters of the environments; methods of combining components and assigning the parameters within an environment graph that fully describes an environment; arranging subdomains of allowed parameter changes within the broader parameter feasibility domains, associated with environment graphs and used to facilitate user interfaces for modification (editing) of presentation environments; the automatic and semi-automatic scenarios for multiple environments based on presentation materials and audience feedback, including editing and updating the presentation environments on the fly.

Various aspects of system functioning are explained as follows.

1. Components of Presentation Environment.

An environment for a video presentation or a video conference (collectively, the "presentation environment") is synthesized from two major parts: background environment and foreground objects.

2. Categorization of Parameters of a Background Environment.

a. Background environments are built of 2D (ordinary and panoramic), 2.5D and 3D basic scenes. The scenes may be any types of visuals (visual components), such as a room interior, a park, a city skyline, a theater, a stadium, a factory, a mountain, a forest, an ocean, or any other view.

b. 2D and 2.5D scenes may be layered over each other to create a 2.5D or a 3D appearance. An example of such layered scene may be a wall of a room with a scenic or regular window and a landscape outside the room visible through the window. An additional layer between the window and the outside view may create additional effects such as fog, rain, or snow.

c. Some of the parameters of a 2D scene are geometry, lighting, and behavior:

i. The geometry of a basic 2D scene may include dimensions, shape, and subdivision into smaller parts (which may also have dimensions and shapes) or connections to larger parts (of other scenes).

For example, a wall may have several panes, spaces designated for different furniture items and paintings, a window, a door, and a built-in fireplace, while a landscape may have a fence, a hill, a brook, and several trees.

ii. The lighting parameter is self-explanatory and may include various effects and may emulate weather, time of the day or season, etc.

iii. Behaviors within 2D scenes of the background environment may include animations (including certain visual effects like weather in section 2b), videos played on panes of scenes, and other dynamic effects.

d. Once the geometry of a basic scene is defined, different parts of the basic scene may be characterized by material, color, texture, and ornament (such as ornaments used in animations-geometric and realistic figures, snowflakes, etc.) of the scene and may be semi- or fully transparent providing visibility to subsequent layer(s).

e. In contrast with the basic 2D and 2.5D scenes, complex 3D scenes, such as a pre-rendered city or museum guide, may not have the parameters described above; the geometry, behavior, and lighting conditions of 3D scenes may be more intricate.

3. Physical, Virtual and Hybrid Presentation Environments.

Physical environments captured at locations of the presenter(s) may be used on par with virtual background environments. Combinations of physical environments and hybrid environments may also be offered by the system. For example, a living room of a presenter may include an ordinary window with a city skyline view. A portion of the room with the window may be replaced during the presentation with a virtual presentation environment where a portion of the wall with the window is covered by an emulated scenic window with a view of a garden.

2D and 2.5D layers may appear "in front of" the presenter and the individual presenters and physical environments of the presenter(s) could be combined in separate layers with virtual layers interspersed between the layers. For example, two presenters may be immersed into a hybrid environment for a joint presentation; one of the presenters may always appear behind another one of the presenters when the contours of the presenters overlap. A virtual window behind the presenters may separate the presenters so that one of the presenters appears in a room and another eventually appears behind the window, etc.

4. Environment Graph.

Every background environment may be fully defined by an environment graph, which includes the structured list of components and parameters explained in section 2; for example, layers of a 2D-2.5D environment with basic scenes and all subordinate parameters characterizing each scene, or a 3D basic scene with relevant parameters, such as lighting or weather emulation through visual effects. Note that certain parameters, especially the parameters characterizing behavior related aspects of the environment, may include ranges of dynamically changing values (for example, altering textures on a surface or videos on a video replay pane or a screen of an emulated TV set). Such dynamic ranges and changes of objects and/or their parameters may be captured by schedules and rules. An important behavioral or general parameter of an environment graph is the timeframe of existence of the graph and cyclicity of existence periods of the graph.

5. Environment Construction Tool.

An environment construction tool may be thought of as an environment graph builder. Such a builder may use a categorized repository of basic scenes, scene geometries, associated parameters, and limitations on combining the scenes. A system of rules and algorithms may define feasible combinations of parameters and may direct a user through the most efficient path to creation of an environment graph. The environment construction tool may also have a machine learning component trained on user feedback, success estimates, and recommendations for building background environments better suited to different types of presentations, as further explained below.

6. Parameter Space.

The multi-dimensional space of parameters used by an environment construction tool may include broad ranges of parameters of an environment (entries of a high-res color palette, choice of texture types, images, tiling and decoration patterns, multiple lighting schemes with variable sources, atmospheric conditions, etc.). The environment construction tool may automatically or semi-automatically (under user direction) cut a relatively small area of available parameter values and combinations of the parameters from the large parameter space, the so-called graph feasibility domain. In principle, every combination of parameters that belongs to the feasibility domain of the environment graph may be used within the existence cycle (session) of the graph; but, typically, only a small part of the combinations materializes through the duration of the presentation, subject to additional restrictions by the user.

7. Target Environments for Presentation Slides and Fragments; Scenarios and Transitions.

Different portions of a presentation may require different background environments depending on the content of the slides and of the talk. For example, an analytic portion of a presentation on new trends of training soccer players may use a business-like calm background environment, while a portion of the presentation showing videos, images and in-field diagrams of real-life training process may be more engaging for the audience if the presentation is conducted within an emulated or pre-recorded 2D or 3D stadium environment.

In this way, different presentation materials and portions of a talk of a presenter may drive multiple presentation environments, directed by a presentation environment scenario, which may include transitions between the environment graphs and the overall routine for the execution of the scenario and the functioning of each of the associated environments.

8. Controlling and Updating Background Environments on the Fly.

A presenter or a presentation team may foresee the need to alter the presentation environment on the fly, in real time, depending on the presentation flow, audience reaction, and other factors. While simple cases of such runtime updates may be handled automatically (for example, omitting a slide may cause the scenario execution system to switch automatically to the background environment for the next slide if the next slide is different from the one preceding the omitted piece(s)), other situations may require non-trivial updates to the presentation environment. To this end, the following process of editing background environments on the fly may be implemented:

a. At the construction phase preceding the presentation, the authoring team may choose a domain of allowed (acceptable) parametric changes for each incremental background environment provided by the scenario; such choice is made from a corresponding feasibility domain of the associated environment graph, which is defined elsewhere herein. The allowed changes may follow expectations of a presenter of the required modifications and may be limited to basic changes that assistant(s) of the presenter(s) may perform on the fly without a noticeable interruption to the presentation flow.

b. When the need for a change of the background environment during the presentation becomes apparent, the presenter may activate an environment graph modification user interface on a private pane of the presenter. This may cause a pop-up/drop-down or other type of display of a minimal set of editing controls, and only for the parameters included in the domain of allowed parametric changes. The presenter may choose desired values for the parameters affected by the change and save changes. The environment graph would be immediately modified, and the changes would take place.

c. Alternatively (or additionally), the presenter may create and reserve an extra set of presentation environments serving as potential replacements for the main presentation environments that may be activated on presenter's demand without explicit parametric changes.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for parametric construction of video presentation and conferencing environments, using, and editing on the fly, such multi-component and multi-parametric presentation environments, driven by presentation scenarios.

Figure 1:
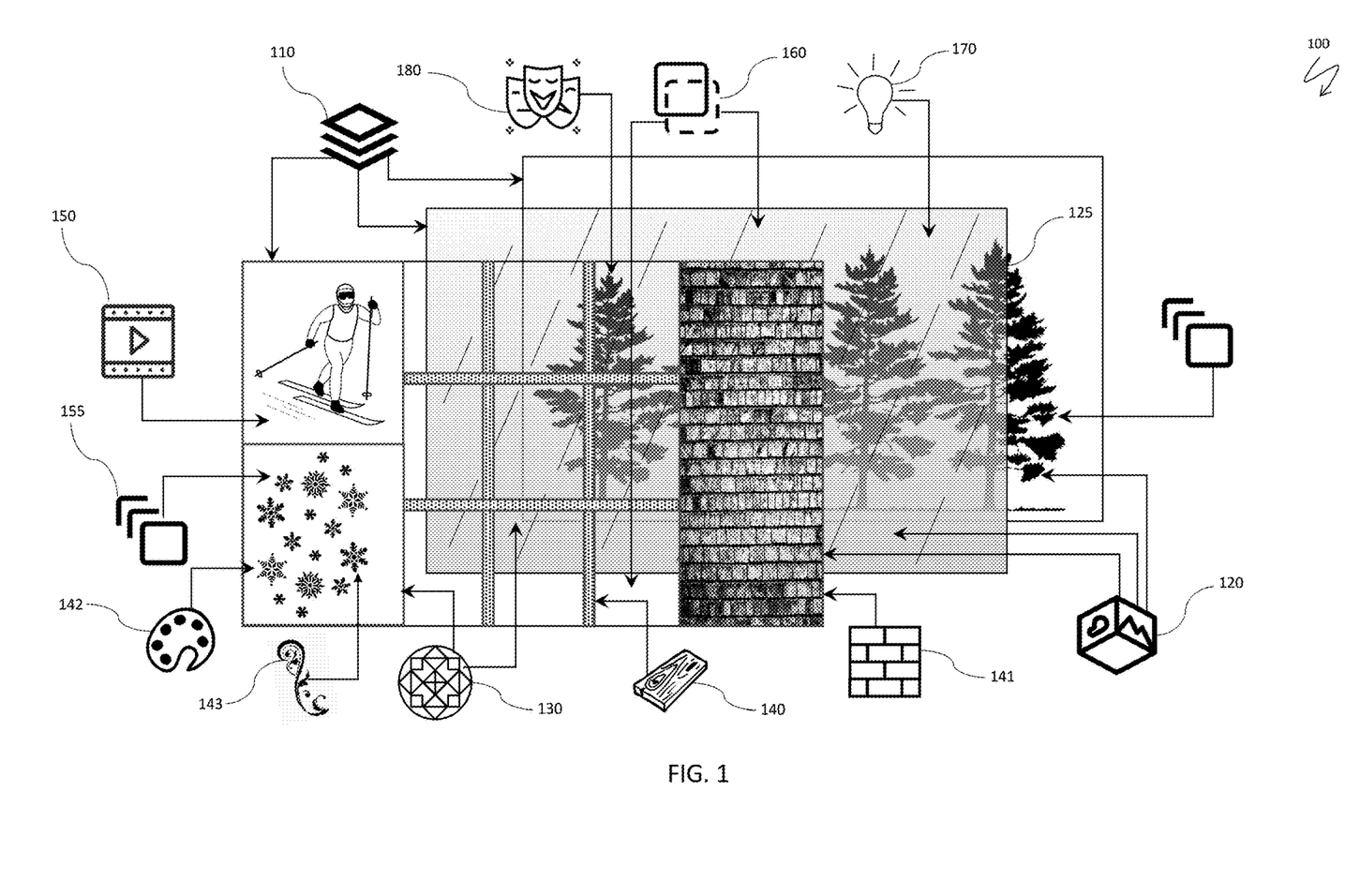
FIG. 1 is a schematic illustration of parameters and properties of a background environment for video presentations, according to an embodiment of the system described herein.

FIG. 1 is a schematic illustration 100 of parameters and properties of a background environment for video presentations. The presentation environment illustrated in FIG. 1 consists of multiple layers 110, where each of the layers 110 may include one or more basic scenes 120. Each of the basic scenes 120 or any object 125 in one of the scenes 120 may have a particular geometry 130, material 140, texture 141, color 142, and ornament (décor) 143.

Furthermore, a background environment may include videos 150 running on object surfaces (such as panes), animations 155 (in the illustration 100, a multicolor "snowflake" ornament is animated). Various objects and surfaces within scenes, and whole layers may possess semitransparency 160, may be subject to lighting effects 170 and may have attached behaviors 180 (such as rain or swaying of treetops in the wind).

Figure 2A:
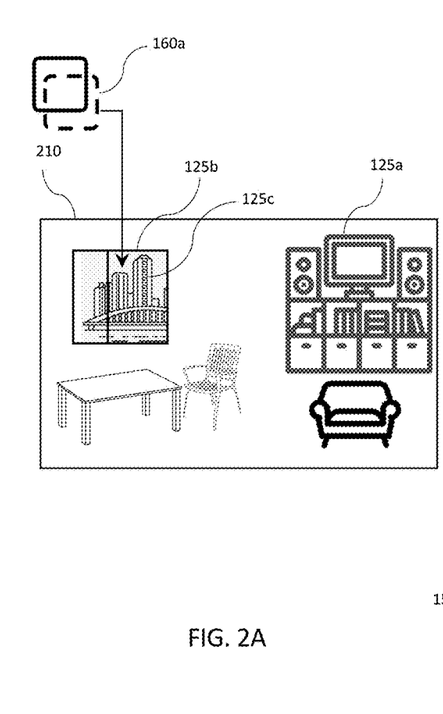
FIGS. 2A-2C are schematic illustrations of physical, virtual and hybrid presentation environments, according to an embodiment of the system described herein.
Figure 2B:
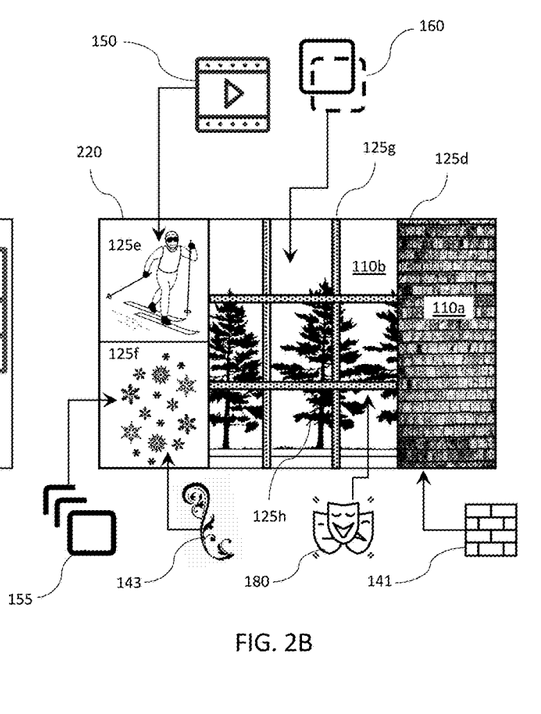
Figure 2C:
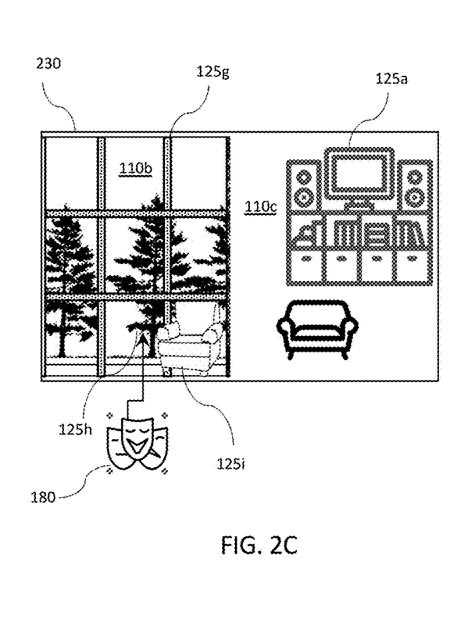

FIGS. 2A-2C are schematic illustrations of physical, virtual and hybrid presentation environments.

FIG. 2A shows a physical environment 210, which is a basic scene with furniture objects 125a, a window 125b, and a city skyline 125c that can be seen through the window 125b.

FIG. 2B shows a synthesized virtual environment 220, which combines two layers 110a, 110b. The first layer 110a includes a basic scene with four objects: a fragment 125d of a wall, textured as indicated by an icon 141; two panels 125e, 125f, where the panel 125e has videos 150 projected upon the panel 125e, and the panel 125f has an animated ornament 143, as indicated by the animations 155; and a scenic window 125g (having transparency indicated by an icon 160) displaying a view of the second layer 110b with a tree line 125h, assigned the behaviors 180.

FIG. 2C illustrates a hybrid physical and virtual environment 230 with a layer 110c and the layer 110b. The first layer 110c combines a fragment of the physical environment 210 (FIG. 2A) with the furniture objects 125a and a fragment of the virtual environment 220 (FIG. 2B)—specifically, the window 125g; the first layer also includes an additional physical object, an armchair 125i positioned in front of the virtual window 125g. The second layer 110b is purely virtual and the same as in FIG. 2B.

Figure 3A:
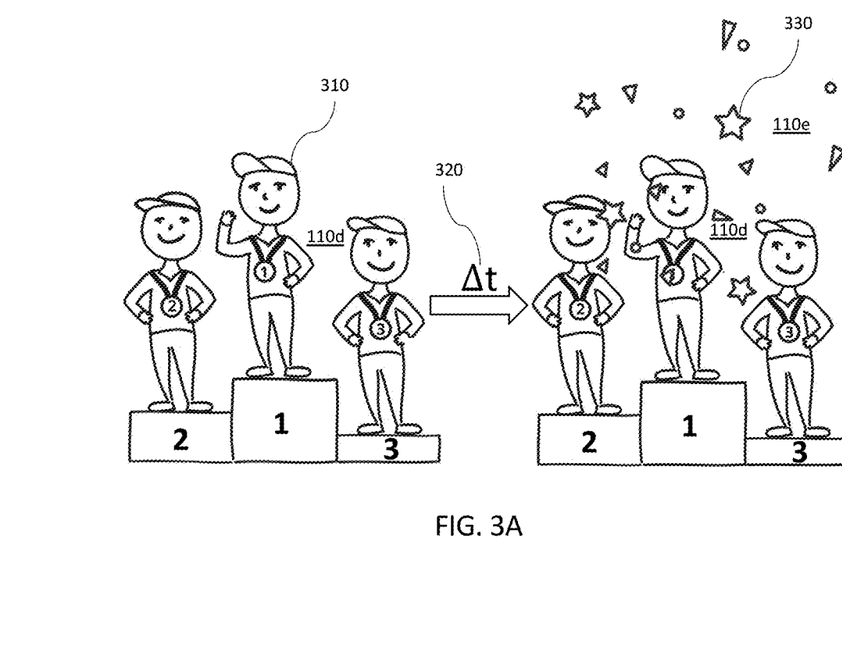
FIGS. 3A-3B are schematic illustrations of different dispositions of physical and virtual layers in presentation environments, according to an embodiment of the system described herein.
Figure 3B:
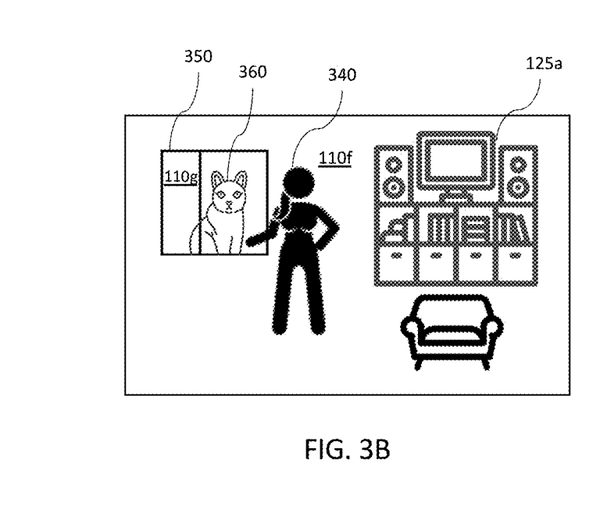

FIGS. 3A-3B are schematic illustrations of different dispositions of physical and virtual layers in presentation environments.

FIG. 3A illustrates the physical layer 110d with objects 310 (individual winners 310 of a tournament), which is transformed after a short time interval 320 into a celebration ceremony, where a new transparent virtual layer 110e contains multi-shaped confetti 330, falling over the winners 310 in front of the physical layer 110d.

FIG. 3B shows a physical layer 110f with the furniture items 125a (see FIGS. 2A, 2C), a female FIG. 340 and a window 350, through which the female FIG. 340 (and the observer) may see a virtual layer 110g with a virtual object 360, located behind the physical layer 110f.

Figure 4:
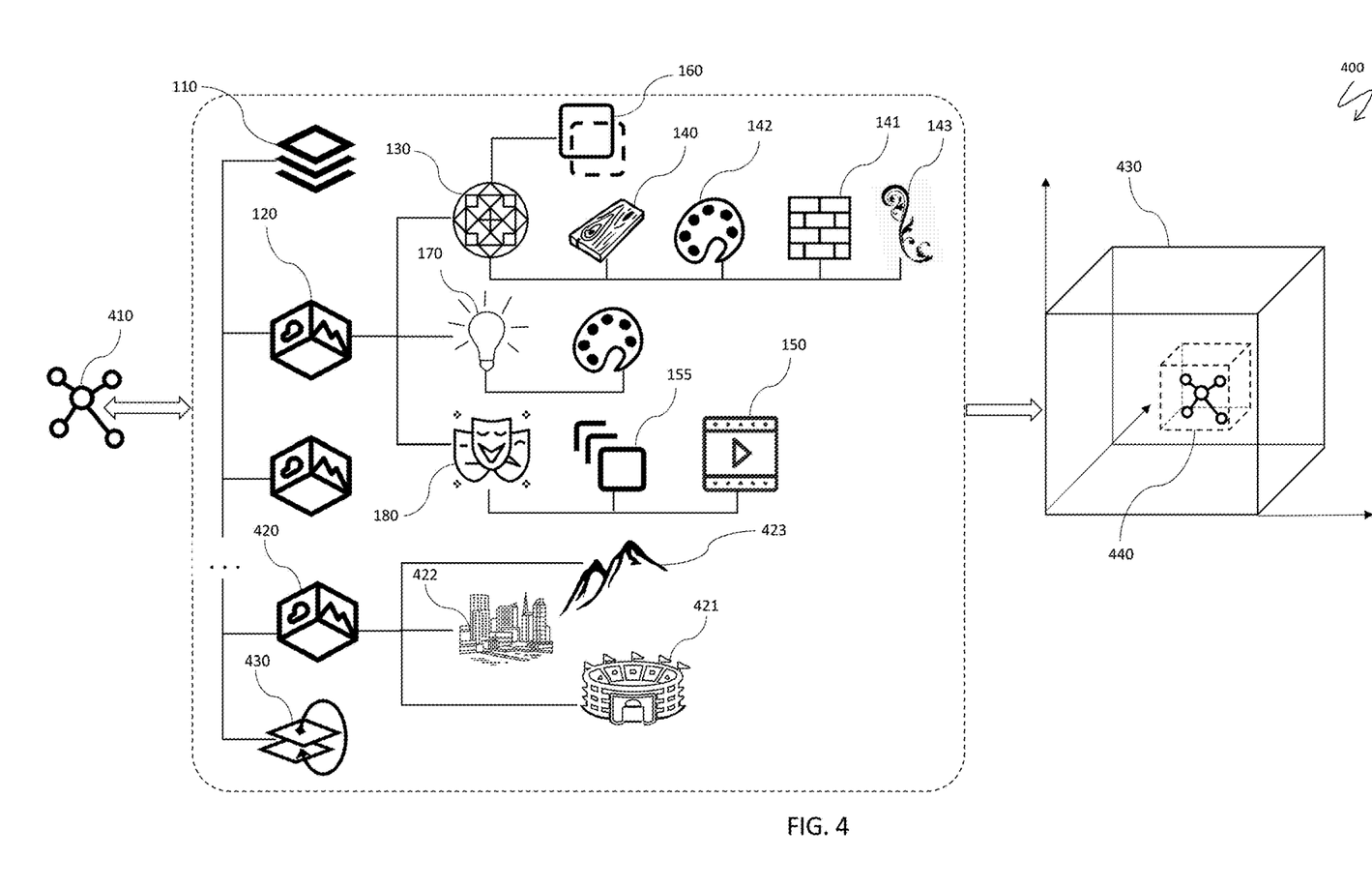
FIG. 4 is a schematic illustration of an environment graph, components of the environment graph, and a parameter space of the environment graph, according to an embodiment of the system described herein.

FIG. 4 is a schematic illustration 400 of an environment graph 410, components of the graph 410, and parameter space of the graph 410. The environment graph 410 may have the multiple layers 110, each having one or more of the basic scenes 120 or complex (possibly pre-rendered) non-layered 3D scenes 420, as explained elsewhere herein (see, for example, section 2 of the Summary). Composition and organization of the layers 110 may be driven by layering rules 430.

The basic scenes 120 include objects (not shown in FIG. 4, see items 125, 125a-125i in FIGS. 1, 2A-2C) with multiple parameters and properties: geometry 130 material, color, texture, and ornament 140, 143, transparency 160, lighting 170 (next to a lighting item is a non-referenced light color icon), the behaviors 180, the animation 155, and the videos 150. As to the complex 3D scenes, FIG. 4 illustrates three examples: a stadium 421, a city skyline 422, and a mountain range 423.

As explained elsewhere herein (see, for example, sections 4, 6 of the Summary), a full parameter range for the layering rules 430 may be too broad and, for practical construction of presentation environments, feasibility domains 440 of scene and object parameters may be used and further restricted for certain applications.

Figure 5:
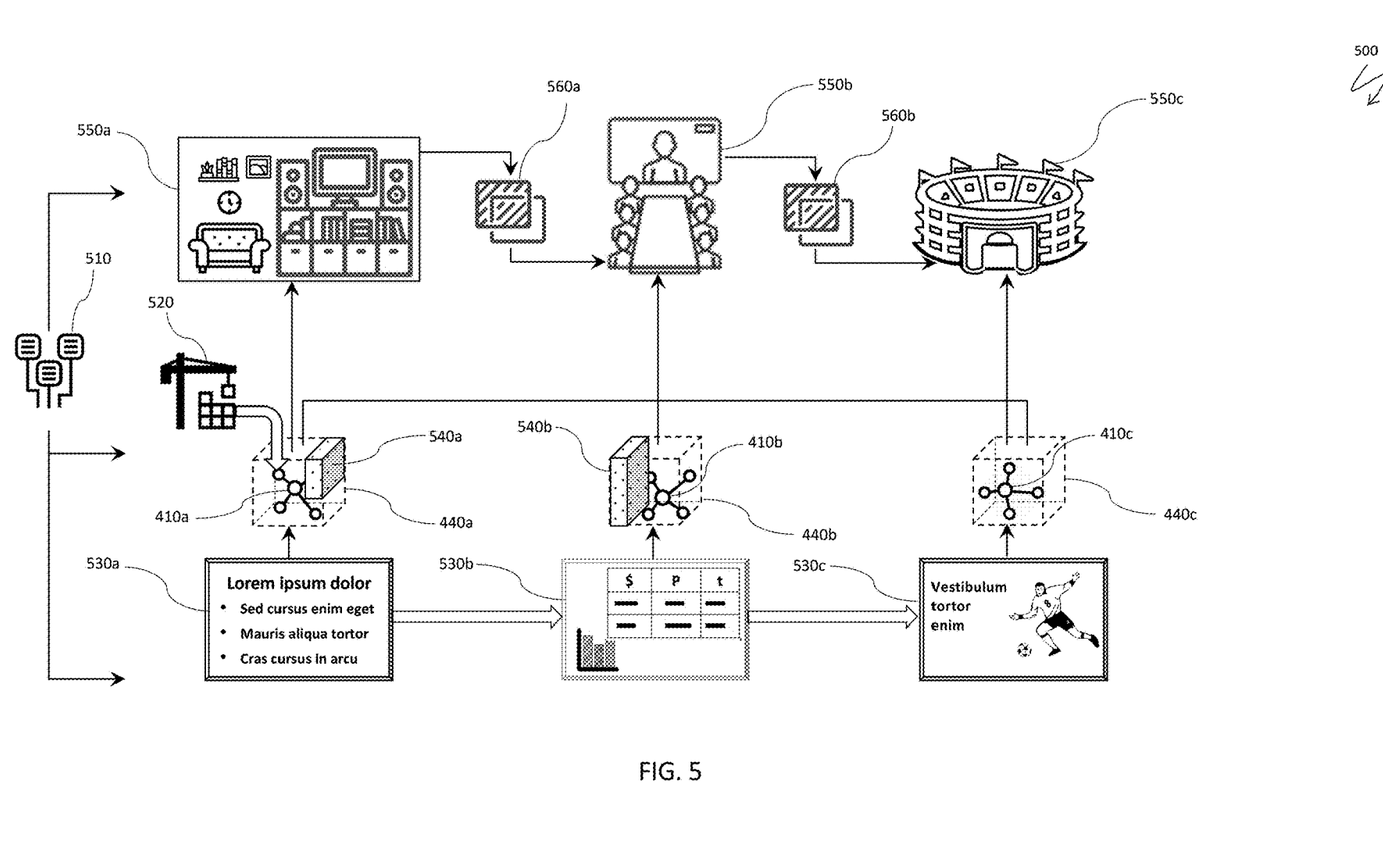
FIG. 5 is a schematic illustration of a scenario for background presentation environments, according to an embodiment of the system described herein.

FIG. 5 is a schematic illustration 500 of a scenario 510 for background presentation environments. The scenario 510 contains an optimized set of background environments 550*a*, 550*b*, 550*c* for a presentation with a series of slides 530*a*, 530*b*, 530*c*. For each slide (or other presentation component, which may be a fragment of a freeform or a continuous presentation, a video, or another visual form), an authoring team builds a plurality of environment graphs 410*a*, 410*b*, 410*c* (see FIG. 4 for more info) using an environment construction tool 520, explained elsewhere herein (see FIG. 4, the accompanying text, and section 5 of the Summary). Additionally, feasibility domains of parameters 440*a*, 440*b* for two of the created environment graphs may be further narrowed down parameters to allowed (acceptable) sets of parameters 540*a*, 540*b*. The restricted parameter ranges may be used for a simplified instant editing of background environments on the fly. Each of the background environments implemented in the scenario 510 reflects the nature, complexity, and emotional state of a talk related to a corresponding slide, which is presented within a particular one of the environments.

Figure 6:
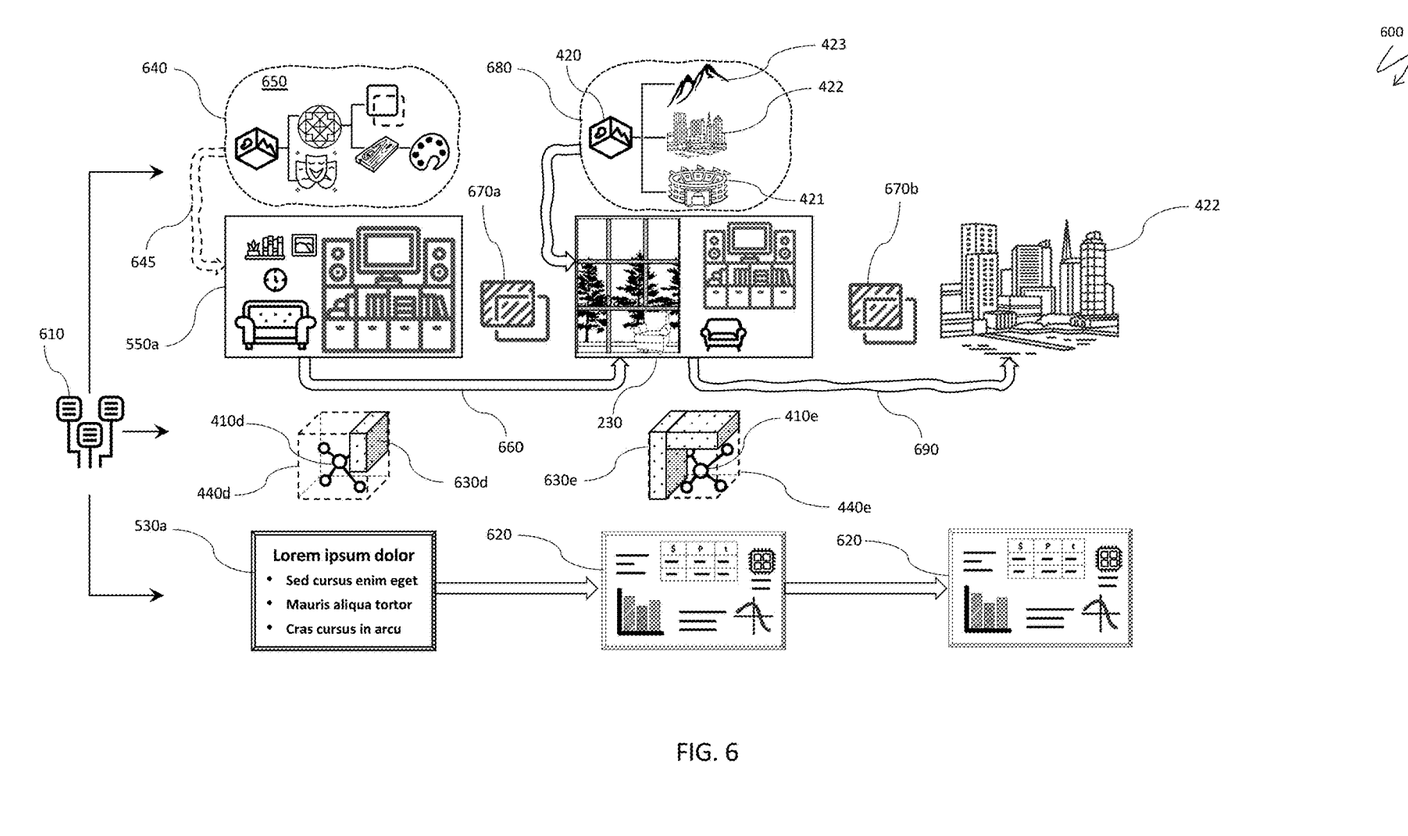
FIG. 6 is a schematic illustration of editing presentation environments in real time, according to an embodiment of the system described herein.

FIG. 6 is a schematic illustration 600 of editing presentation environments in real time. Analogously to FIG. 5, a scenario 610 contains an optimized set of background environments enhancing a presentation impact for the slide 530*a* (same as in FIG. 5) and another slide 620. For each of the slides 530*a*, 620, an original environment graph is built and added to the scenario 610. Specifically, an environment graph 410*d* with a feasibility domain of parameters 440*d* is representing the slide 530*a*, and a graph 410*e* with a feasibility domain 440*e* is built for the slide 620 (see FIGS. 4, 5 and the accompanying texts for more info). Additionally, the two feasibility domains 440*d*, 440*e* are further narrowed down, and two allowed (acceptable) sets of parameters 630*d*, 630*e* are added to the scenario 610 and may be used for simplified editing of background environments on the fly.

When the presenter talks about the first slide 530*a*, the slide 530*a* and a presenter image may be immersed into the first background environment 550*a* (same as in FIG. 5) described within the scenario 610 by the first environment graph 410*d*. At some point during the presentation of the slide 530*a*, the presenter may realize that the talk or the audience feedback does not fully endorse the background environment 550*a*; the presenter may then invoke an editing interface 640 on a private presenter screen or pane, as explained elsewhere herein; the editing interface 640 includes a portion 650 of the environment graph 410*d*, subject to allowed (editable) sets of parameters, schematically shown as a dotted parallelepiped 630*d*. In FIG. 6, the presenter initially intends to modify the background environment 550*a* as shown by a sketched and dashed arrow 645; however, the presenter decides against the change, completes the portion of the presentation related to the first slide 530*a*, and moves to the next slide 620 and the virtual environment 230 (see FIG. 2C) in accordance with the original scenario 610, which is illustrated by a regular arrow 660 and is accompanied by an automatically created audio-visual transition 670*a*.

Like the presentation of the first slide, the presenter may be dissatisfied with the presentation flow and/or the audience reaction (not shown in FIG. 6) of the second slide 620 and may invoke a runtime editing interface 680, which is different from the first editing interface 640. The runtime editing interface 680 provides an instant editing option, represented by the parameters 630*e* in connection with the environment graph 410*e*, includes an option of replacing the whole virtual environment 230 with a complex 3D space, as explained above in connection with the items 420-423 (a replica of a fragment of the general environment graph 410 shown in FIG. 4, which has more info on this options). In this case, the presenter chooses the 3D environment 422 (a portion of the city skyline) and replaces the background environment on the fly, as shown by a sketched arrow 690. Simultaneously, an audio-video transition segment 670*b* is generated and displayed, so that the scenario 610 is modified on the fly (the modification may be recorded for files of the presenter, for future machine learning opportunities and for other uses), and the presenter completes the talk related to slide 620 within the new background environment 422.

Figure 7:
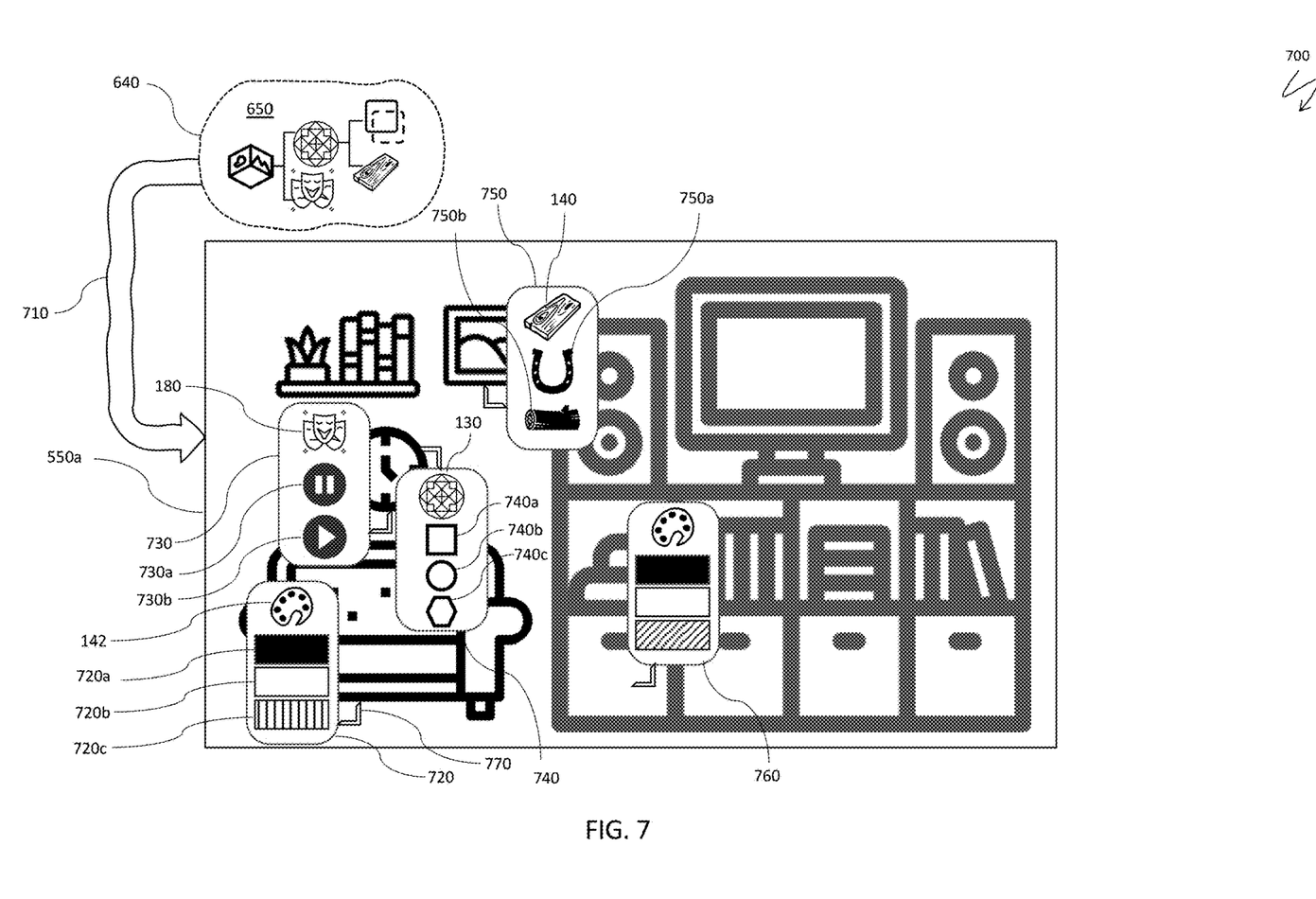
FIG. 7 is a schematic illustration of a contextual user interface for editing presentation environments in real time, according to an embodiment of the system described herein.

FIG. 7 is a schematic illustration 700 of the contextual user interface for editing presentation environments in real time. During a presentation, the presenter (not shown in FIG. 7) invokes the real-time editing interface 640 to modify the background environment 550*a* (see FIG. 6). As in FIG. 6, the portion 650 of the environment graph 410*d* (a subdomain of the feasibility domain) represents a fragment of the general environment graph of FIG. 4 with additionally restricted values for each parameter, as explained below.

In contrast with the FIG. 6 where the presenter abandoned editing, in FIG. 7 the presenter actuates the contextual editing interface, as indicated by a solid sketched arrow 710. The presenter action results in the set of contextual dropdown panes 720, 730, 740, 750, 760, attached to the editable objects by angular brackets 770. Each of the panes 720, 730, 740, 750, 760 corresponds to a specific parameter, explained in conjunction with the definition of the environment graph in FIG. 4 and displayed on top of each of the panes 720, 730, 740, 750, 760, with allowed values shown below the parameter icon in each of the panes 720, 730, 740, 750, 760.

The pane 720 is attached to a couch and allows modifying the upholstery color. The pane 720 includes the color icon 142 (see FIG. 4 for the enumeration of all parameters) and three color values: black 720*a*, white 720*b* and beige 720*c*.

The pane 730 is a behavior pane attached to a wall clock; an icon for the behaviors 180 is accompanied by two available values: clock illustration with still hands 730*a*, and fully functioning clock 730*b*.

The pane 740 is another pane for editing the wall clock; the pane 740 allows changing the geometry 130, the clock shape, between a square shape 740*a*, a round (current) shape 740*b*, and a hexagonal shape 740*c*.

The pane 750 (the material icon 140 is placed on top of the pane) allows modifying material of the picture frame between metal 750*a* and wood 750*b*.

The pane 760 is a color pane and is analogous to the pane 720 and controls the color of a bookcase, differing in the third color (for example, a mahogany wood).

Figure 8:
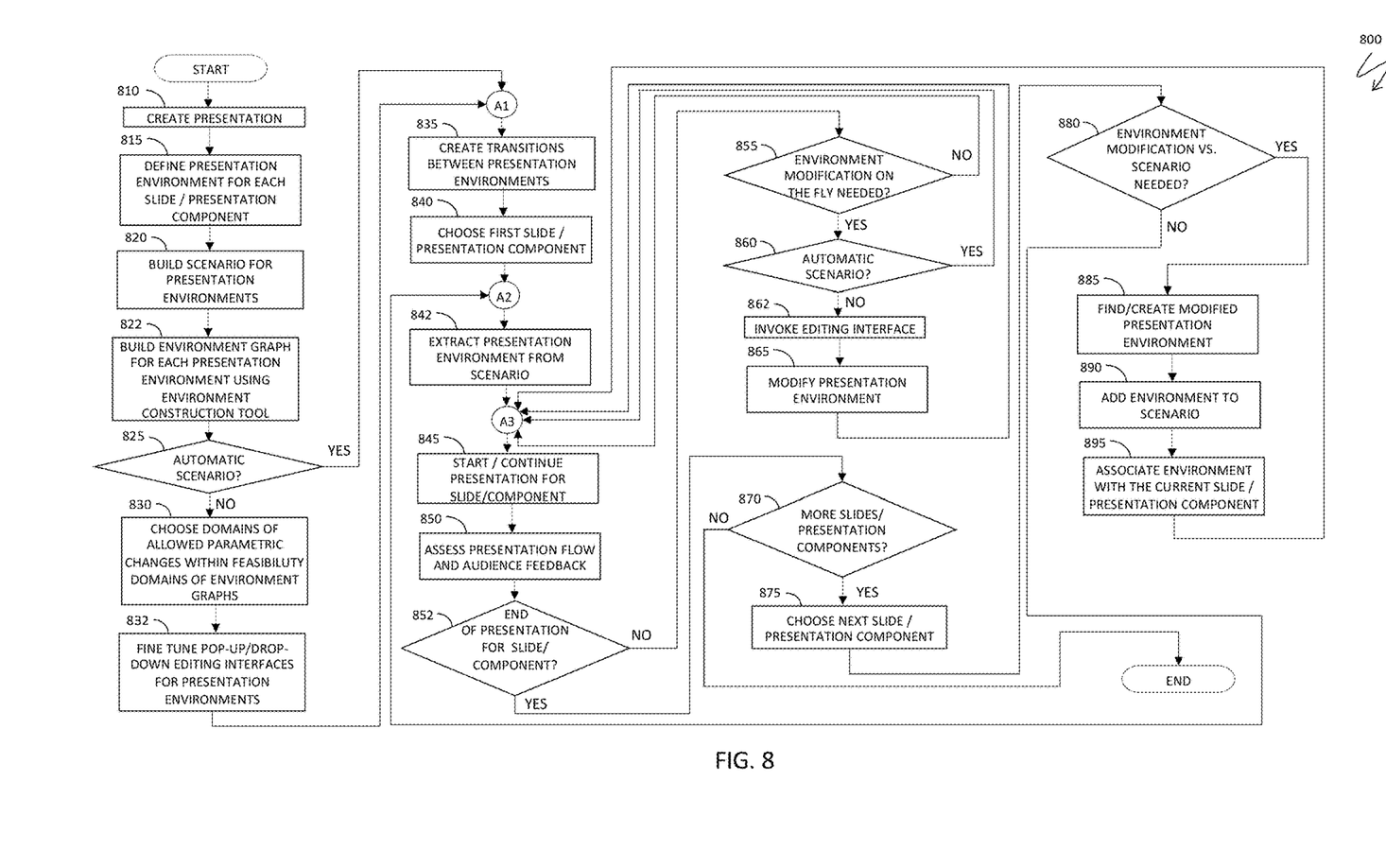
FIG. 8 is a system flow diagram illustrating system functioning in connection with building, editing, and using background environments for presentations, according to an embodiment of the system described herein.

Referring to FIG. 8, a system flow diagram 800 illustrates system functioning in connection with building, editing, and using background environments for presentations. Processing begins at a step 810, where a presentation is created. After the step 810, processing proceeds to a step 815, where a draft of a desired presentation environment is defined for each slide or other presentation component. After the step 815, processing proceeds to a step 820, where a scenario is built for the presentation environments, as explained elsewhere herein (see, for example, FIGS. 4-6 and the accompanying text). After the step 820, processing proceeds to a step 822, where an environment graph is built for each background environment corresponding to a slide or other presentation component using an environment construction tool (see, for instance, section 5-7 of the Summary and FIGS. 4, 5 with the accompanying text).

After the step 822, processing proceeds to a test step 825, where it is determined whether a chosen scenario is automatic, i.e., does not allow runtime modifications of the background environments. If not, processing proceeds to a step 830, where subdomains of allowed parametric changes are chosen within feasibility domains of environment graphs, as explained in connection with FIGS. 5, 6. After the step 830, processing proceeds to a step 832, where a presentation team fine-tunes pop-up, drop-down and other interface components to facilitate instant runtime editing of presentation environments. After the step 832, processing proceeds to a step 835, where transitions between presentation environments corresponding to all pairs of adjacent slides (or other presentation components) are created. (Note that the step 835 may be independently reached from the test step 825 if it is determined that the chosen scenario is automatic.)

After the step 835, processing proceeds to a step 840, where the presenter chooses the first slide or presentation component. After the step 840, processing proceeds to a step 842, where the presentation environment originally designed for the current slide (presentation component) is extracted from the scenario. After the step 842, processing proceeds to a step 845, where the presenter starts or continues presentation for the current slide/component. After the step 845, processing proceeds to a step 850, where the system and the presenter (presenter's team) jointly assess the presentation flow and the audience feedback. After the step 850, processing proceeds to a test step 852, where it is determined whether the end of presentation for the current slide (or the current presentation component) has been reached. If not, processing proceeds to a test step 855, where it is determined whether a modification of the current environment on the fly is required/desired. If not, processing proceeds to the step 845, discussed above, which may be independently reached from the step 842; otherwise, processing proceeds to a test step 860, where it is determined whether the scenario is automatic. If so, processing proceeds to the step 845, which may be independently reached from the step 842 and the test step 855; otherwise, processing proceeds to a step 862, where the presenter invokes the runtime editing interface, as explained elsewhere herein (see FIG. 6 and the accompanying text). After the step 862, processing proceeds to a step 865, where the presenter modifies the presentation environment on the fly, as explained in connection with FIG. 6. After the step 865, processing proceeds to the step 845, which may be independently reached from the step 842 and the test steps 855, 860.

If it is determined at the test step 852 that the end of presentation for the current slide or other presentation component has been reached, processing proceeds to a test step 870, where it is determined whether there are more slides or presentation components in the presentation. If not, processing is complete; otherwise, processing proceeds to a step 875, where the presenter (or an assistant or, automatically, the system) chooses a next slide or a next presentation component. After the step 875, processing proceeds to a test step 880, where it is determined whether an instant modification of the background environment or the scenario is needed. If not, processing proceeds to the step 842, which may be independently reached from the step 840; otherwise, processing proceeds to a step 885, where the modified presentation environment is created or found (analogously to the choice of a complex 3D environment in the middle of the presentation in FIG. 6). After the step 885, processing proceeds to a step 890, where the new presentation environment is added to the scenario. After the step 890, processing proceeds to a step 895, where the new background environment is associated with the current slide or other presentation component. After the step 895, processing proceeds to the step 845, which may be independently reached from the steps 842, 865 and the test steps 855, 860.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: iOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing a video presentation, comprising:
preparing a plurality of different background environments for different portions of the video presentation prior to the video presentation, the background environments including a structured list of visual components and parameters therefor;
selecting a subset of the background environments, value ranges, and initial values for a subset of the parameters of the background environments prior to the video presentation;
selecting multiple alternative background environments for at least one of the portions prior to the video presentation;
presenting to an audience at least one presenter superimposed on the different ones of the background environments during different portions of the video presentation;

replacing a particular one of the background environments for the at least one of the portions during the presentation with one of the multiple alternative background environments; and modifying values selected for at least some of the subset of the parameters during the video presentation within the value ranges.

2. The method of claim 1, wherein at least one of the background environments is a physical background environment.

3. The method of claim 2, wherein a visual component is superimposed on at least one portion of at least one of the physical background environments.

4. The method of claim 2, wherein a plurality of virtual layers are superimposed with at least one of the physical background environments.

5. The method of claim 4, wherein at least some of the layers are semi-transparent or fully transparent to provide visibility to at least one of subsequent ones of the layers.

6. The method of claim 2, wherein at least one of the physical background environments is one of: a room interior, a park, a city skyline, a theater, a stadium, a factory, a mountain, a forest, or an ocean.

7. The method of claim 1, wherein the parameters include geometry, lighting, and behavior.

8. The method of claim 7, wherein geometry includes at least one of: dimension of the components, shape of the components, subdivision of the components, or connections of the components to other components or to background environments.

9. The method of claim 7, wherein the lighting emulates at least one of: weather, time of the day, or season.

10. The method of claim 7, wherein the behavior includes at least one of: animations, videos played on panes of one of the background environments, or dynamic effects.

11. The method of claim 7, wherein different parts of the particular background environment are characterized by material, color, texture, and ornament.

12. The method of claim 1, wherein values for at least some of the subset of parameters are modified automatically based on reaction of the audience to the video presentation.

13. The method of claim 1, wherein the at least one presenter modifies values selected for at least some of the subset of parameters based on reaction of the audience to the video presentation.

14. The method of claim 13, wherein the at least one presenter modifies values by invoking a runtime editing interface that automatically actuates drop down panes attached to a subset of the background environments to present value ranges of parameters.

15. The method of claim 13, wherein a runtime editing interface to modify the values is automatically invoked and actuates drop down panes attached to a subset of the background environments to present value ranges of parameters.

16. A non-transitory computer readable medium containing software that provides a video presentation using a plurality of different background environments having a structured list of visual components and parameters for different portions of the video presentation that are prepared prior to the video presentation where, prior to the video presentation, a subset of the background environments, value ranges, and initial values for a subset of the parameters of the background environments are selected and where, prior to the video presentation, multiple alternative background environments are selected for at least one of the portions of the video presentation, the software comprising:

executable code that presents to an audience at least one presenter superimposed on the different ones of the background environments during different portions of the video presentation;

executable code that replaces a particular one of the background environments for the at least one of the portions during the presentation with one of the multiple alternative background environments; and executable code that modifies values selected for at least some of the subset of the parameters during the video presentation within the value ranges.

* * * * *